(12) United States Patent
Kim

(10) Patent No.: US 12,552,229 B2
(45) Date of Patent: Feb. 17, 2026

(54) VEHICLE HVAC SYSTEM

(71) Applicants: Hyundai Motor Company, Seoul (KR); Kia Corporation, Seoul (KR)

(72) Inventor: Kwang Min Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 140 days.

(21) Appl. No.: 18/637,888

(22) Filed: Apr. 17, 2024

(65) Prior Publication Data

US 2025/0153541 A1    May 15, 2025

(30) Foreign Application Priority Data

Nov. 9, 2023   (KR) .......................... 10-2023-0154827

(51) Int. Cl.
  *B60H 1/00* (2006.01)
(52) U.S. Cl.
  CPC ..... *B60H 1/00921* (2013.01); *B60H 1/00385* (2013.01); *B60H 2001/00928* (2013.01); *B60H 2001/00949* (2013.01); *B60H 2001/00957* (2013.01)
(58) Field of Classification Search
  CPC ............ B60H 1/00921; B60H 1/00385; B60H 1/32281; B60H 1/00278; B60H 1/00485; B60H 1/143; B60H 1/3227; B60H 2001/00928; B60H 2001/00949; B60H 2001/00957; F25B 40/00; B60Y 2200/90
  See application file for complete search history.

(56) References Cited

FOREIGN PATENT DOCUMENTS

| CN | 105848937 A | * | 8/2016 | ............... B60H 1/08 |
| DE | 102021117580 A1 | * | 3/2022 | ......... B60H 1/00899 |

* cited by examiner

*Primary Examiner* — Emmanuel E Duke
(74) *Attorney, Agent, or Firm* — Slater Matsil, LLP

(57) ABSTRACT

An embodiment HVAC system includes a compressor, an interior condenser disposed on a downstream side of the compressor, a refrigerant heat exchanger located between the interior condenser and the compressor, wherein the refrigerant heat exchanger is configured to transfer heat between an expanded refrigerant and a non-expanded refrigerant of a refrigerant discharged from the interior condenser, a water-cooled heat exchanger disposed on a downstream side of the interior condenser and configured to transfer heat between the refrigerant and a coolant circulating in a coolant system, an exterior heat exchanger disposed on the downstream side of the interior condenser and configured to transfer heat between the refrigerant and ambient air, and a control valve unit configured to control a flow of the refrigerant and expansion and/or non-expansion of the refrigerant between the interior condenser, the water-cooled heat exchanger, the exterior heat exchanger, and the refrigerant heat exchanger.

20 Claims, 6 Drawing Sheets

VEHICLE HVAC SYSTEM

CROSS-REFERENCE TO RELATED APPLICATIONS

This application claims the benefit of Korean Patent Application No. 10-2023-0154827, filed on Nov. 9, 2023, which application is hereby incorporated herein by reference.

TECHNICAL FIELD

The present disclosure relates to a vehicle heating, ventilation, and air conditioning (HVAC) system.

BACKGROUND

With a growing interest in energy efficiency and environmental issues, there is a demand for development of eco-friendly vehicles that can replace internal combustion engine vehicles. Such eco-friendly vehicles are classified into electric vehicles which are driven using fuel cells or electricity as a power source and hybrid vehicles which are driven using an engine and a battery.

Electric vehicles or hybrid vehicles may include a heating, ventilation, and air conditioning (HVAC) system for air conditioning in a cabin (or passenger compartment). The HVAC system may be configured to heat and cool the air in the cabin for passenger comfort.

In order to ensure driving safety, electric vehicles or hybrid vehicles may include a power electronics (PE) cooling system designed to maintain PE components of a PE system at appropriate temperatures and a battery cooling system designed to maintain a battery at an appropriate temperature. The PE cooling system may cool the PE components such as an electric motor, an inverter, an on-board charger (OBC), and a low DC-DC converter (LDC), thereby keeping the PE components at their respective appropriate temperatures. The battery cooling system may cool the battery, thereby keeping the battery at its appropriate temperature.

The HVAC system and the PE cooling system may be thermally connected through a water-cooled heat exchanger. When the HVAC system operates in a heating mode, a refrigerant may absorb heat from a PE coolant circulating in the PE cooling system through the water-cooled heat exchanger. That is, the refrigerant may be configured to absorb waste heat of the PE components through the water-cooled heat exchanger.

When the HVAC system operates in the heating mode, the refrigerant compressed by a compressor may be condensed by an interior condenser, and the refrigerant may heat the air passing by an exterior surface of the interior condenser so that the heating of the cabin may be performed. The refrigerant discharged from the interior condenser may be expanded by an expansion valve, and the expanded refrigerant may be evaporated by the water-cooled heat exchanger.

When the HVAC system operates in a heating and dehumidification mode, the refrigerant compressed by the compressor may be condensed by the interior condenser, and the refrigerant may heat the air passing by the exterior surface of the interior condenser so that the heating of the cabin may be performed. The refrigerant discharged from the interior condenser may be expanded by the expansion valve. A portion of the expanded refrigerant may be evaporated by the water-cooled heat exchanger, a remaining portion of the expanded refrigerant may be evaporated in an evaporator, and the air passing by an exterior surface of the evaporator may be cooled so that dehumidification of the cabin may be performed.

In the HVAC system according to the related art, however, when the refrigerant fails to sufficiently absorb heat through the water-cooled heat exchanger, the evaporation of the refrigerant may be reduced, and accordingly a suction pressure of the compressor may be lowered below a threshold pressure. When the suction pressure of the compressor is lower than the threshold pressure, efficiency of the compressor may be reduced, and accordingly the RPM of the compressor may be lowered below a threshold RPM or the compressor may be stopped. As a result, the coefficient of performance (COP) of the HVAC system may be degraded. As the heating of the cabin with the use of the refrigerant is not performed, but the cabin is only heated by an electric heater of the HVAC system, electric efficiency of the electric vehicle may be reduced.

In the related art HVAC system, as the heat absorption of the refrigerant is reduced, the amount of evaporation of the refrigerant may be insufficient. Accordingly, the heating and dehumidification of the cabin with the use of the refrigerant may not be smoothly performed due to the RPM reduction or stop of the compressor, and the heating of the cabin may be performed by the electric heater so that the electric efficiency of the electric vehicle may be reduced.

The above information described in this background section is provided to assist in understanding the background of the inventive concept and may include any technical concept which is not considered as the prior art that is known to the public.

SUMMARY

The present disclosure relates to a vehicle heating, ventilation, and air conditioning (HVAC) system. Particular embodiments relate to a vehicle HVAC system designed to improve heating performance and/or dehumidification performance by a refrigerant using a control valve unit and a refrigerant heat exchanger disposed between a compressor and an interior condenser, thereby improving electric efficiency of an electric vehicle.

Embodiments of the present disclosure can solve problems occurring in the prior art while advantages achieved by the prior art are maintained intact.

An embodiment of the present disclosure provides a vehicle heating, ventilation, and air conditioning (HVAC) system designed to improve heating performance and/or dehumidification performance by a refrigerant using a control valve unit and a refrigerant heat exchanger disposed between a compressor and an interior condenser, thereby improving electric efficiency of an electric vehicle.

According to an embodiment of the present disclosure, a vehicle HVAC system may include a compressor, an interior condenser disposed on the downstream side of the compressor, a refrigerant heat exchanger located between the interior condenser and the compressor, a water-cooled heat exchanger disposed on the downstream side of the interior condenser and transferring heat between a refrigerant and a coolant circulating in a coolant system, an exterior heat exchanger disposed on the downstream side of the interior condenser and transferring heat between the refrigerant and ambient air, and a control valve unit controlling the flow of the refrigerant and expansion and/or non-expansion of the refrigerant between the interior condenser, the water-cooled heat exchanger, the exterior heat exchanger, and the refrigerant heat exchanger. The refrigerant heat exchanger may be configured to transfer heat between an expanded refrigerant and a non-expanded refrigerant of the refrigerant discharged from the interior condenser.

The refrigerant heat exchanger may include a first passage through which the non-expanded refrigerant passes and a second passage through which the expanded refrigerant passes.

The control valve unit may include a first control valve allowing the refrigerant discharged from the interior condenser to be directed to the exterior heat exchanger or bypass the exterior heat exchanger.

The first control valve may include an inlet port fluidly connected to the interior condenser, a first outlet port fluidly connected to the first passage of the refrigerant heat exchanger and an outlet of the exterior heat exchanger, and a second outlet port fluidly connected to an inlet of the exterior heat exchanger.

The first control valve may be configured to allow the inlet port to selectively communicate with the first outlet port or the second outlet port.

The control valve unit may include a second control valve allowing the refrigerant discharged from the interior condenser or the refrigerant discharged from the first passage of the refrigerant heat exchanger to be directed to the water-cooled heat exchanger.

The second control valve may include a first inlet port fluidly connected to the interior condenser, a second inlet port fluidly connected to the first passage of the refrigerant heat exchanger, and an outlet port fluidly connected to a first passage of the water-cooled heat exchanger.

The second control valve may be configured to allow the first inlet port or the second inlet port to selectively communicate with the outlet port.

The opening degree of the second control valve may be adjusted when the first inlet port or the second inlet port communicates with the outlet port.

The control valve unit may include a third control valve allowing the refrigerant discharged from the interior condenser or the exterior heat exchanger to be directed to the second passage of the refrigerant heat exchanger.

The third control valve may include a first inlet port fluidly connected to the interior condenser, a second inlet port fluidly connected to the exterior heat exchanger, and an outlet port fluidly connected to an inlet of the second passage of the refrigerant heat exchanger.

The third control valve may be configured to allow the first inlet port or the second inlet port to selectively communicate with the outlet port.

The water-cooled heat exchanger and the exterior heat exchanger may be connected in parallel to a refrigerant circulation path.

The vehicle HVAC system may further include a cooling-side expansion valve located on the downstream side of the first passage of the refrigerant heat exchanger and an evaporator located on the downstream side of the cooling-side expansion valve.

An inlet of the first passage of the refrigerant heat exchanger may be located on the downstream side of the interior condenser and the downstream side of the exterior heat exchanger, an inlet of the second passage of the refrigerant heat exchanger may be located on the downstream side of the interior condenser and the downstream side of the water-cooled heat exchanger, and an outlet of the second passage of the refrigerant heat exchanger may be located on the upstream side of the compressor.

BRIEF DESCRIPTION OF THE DRAWINGS

The above and other objects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
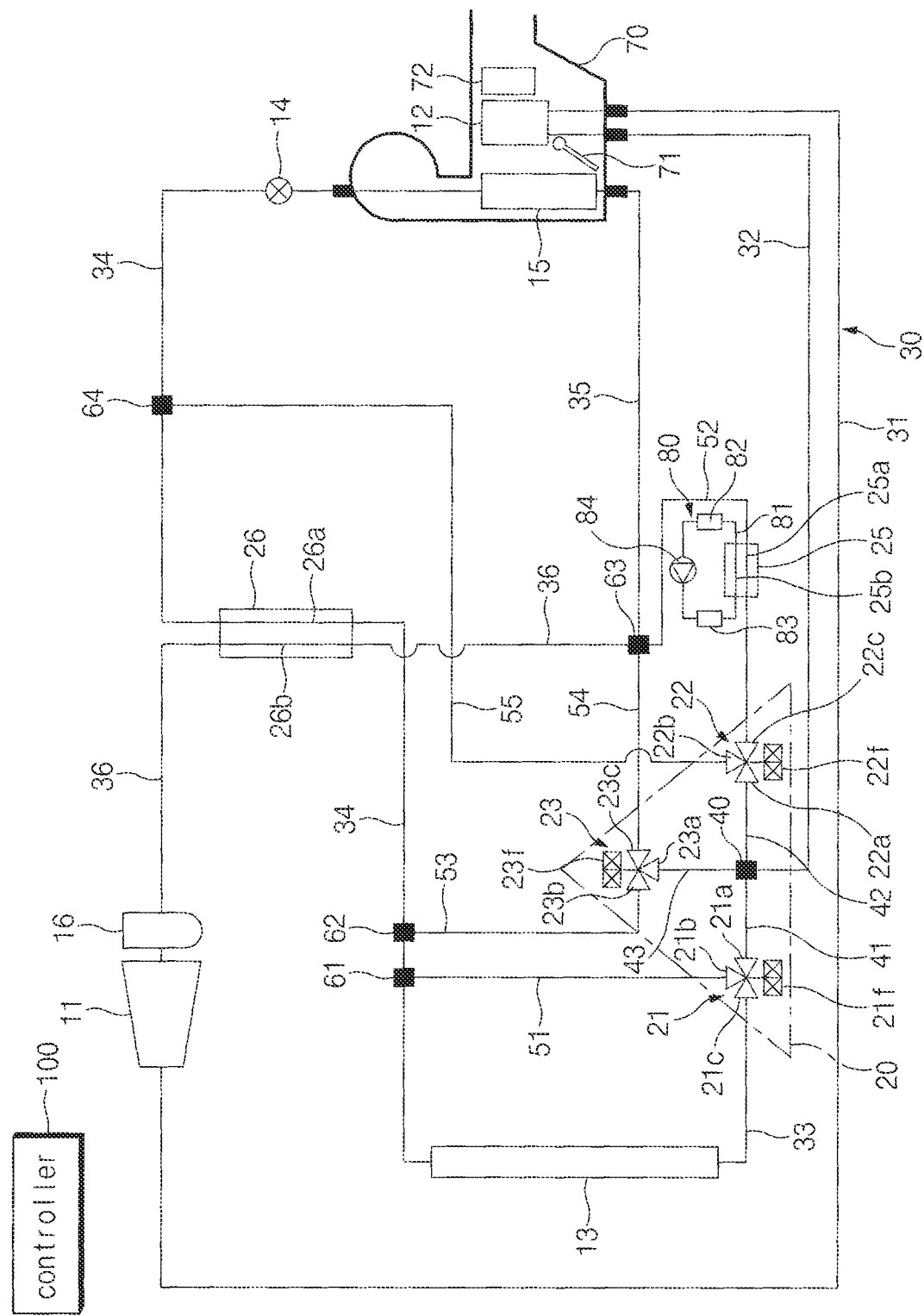
FIG. 1 illustrates a vehicle heating, ventilation, and air conditioning (HVAC) system according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence, or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art and are not to be interpreted as having ideal or excessively formal meanings unless clearly defined as having such in the present application.

Referring to FIG. 1, a vehicle heating, ventilation, and air conditioning (HVAC) system according to an exemplary embodiment of the present disclosure may be configured to heat or cool air in a cabin of the vehicle using phase changes of a circulating refrigerant. The HVAC system may include a refrigerant circulation path 30 through which the refrigerant is allowed to circulate and an HVAC case 70. The refrigerant circulation path 30 may be fluidly connected to a compressor 11, an interior condenser 12, a water-cooled heat exchanger 25, an exterior heat exchanger 13, a cooling-side expansion valve 14, an evaporator 15, and a refrigerant heat exchanger 26. The refrigerant circulation path 30 may allow the flow of the refrigerant to vary depending on various operating modes of a vehicle thermal management system.

The compressor 11 may compress the refrigerant to allow the refrigerant to circulate. The compressor 11 may include a compressor motor and a compression section operated by the compressor motor. The refrigerant circulation path 30 may be fluidly connected to the compression section of the compressor 11.

The HVAC system may include an accumulator 16 disposed on the upstream side of the compressor 11. The accumulator 16 may be located between the evaporator 15 and the compressor 11, and the accumulator 16 may separate a liquid refrigerant from the refrigerant received from the evaporator 15, thereby preventing the liquid refrigerant from flowing into the compressor 11.

The interior condenser 12 may be configured to condense the refrigerant received from the compressor 11, and accordingly the air passing by the interior condenser 12 may be heated by the refrigerant passing through an internal passage of the interior condenser 12. As the air heated by the interior condenser 12 is directed into the cabin, the cabin may be heated.

The water-cooled heat exchanger 25 may be disposed on the downstream side of the interior condenser 12, and the water-cooled heat exchanger 25 may be thermally connected to a coolant system 80. The water-cooled heat exchanger 25 may be configured to transfer heat between a coolant circulating in the coolant system 80 and the refrigerant circulating in the refrigerant circulation path 30.

According to an exemplary embodiment, the water-cooled heat exchanger 25 and the exterior heat exchanger 13 may be connected in parallel to the refrigerant circulation path 30.

According to an exemplary embodiment, the coolant system 80 may be a power electronics (PE) cooling system configured to cool a PE component 82. The coolant system 80 may include a coolant circulation path 81 through which the coolant circulates, the PE component 82 fluidly connected to the coolant circulation path 81, a PE radiator 83 fluidly connected to the coolant circulation path 81, and a pump 84 pumping the coolant. The PE component 82 may be an electric motor, an inverter, and a power conversion component. The PE radiator 83 may be disposed adjacent to a front grille of the vehicle, and the coolant passing through the PE radiator 83 may be cooled by the ambient air forcibly blown by a cooling fan. The PE component 82 may have a coolant passage provided inside or outside thereof, and the coolant may pass through the coolant passage. The coolant passage of the PE component 82 may be fluidly connected to the coolant circulation path 81.

The water-cooled heat exchanger 25 may include a first passage 25a fluidly connected to the refrigerant circulation path 30 and a second passage 25b fluidly connected to the coolant circulation path 81. When the temperature of the PE component 82 increases, the coolant may absorb heat from the PE component 82 so that the temperature of the coolant may relatively increase. The refrigerant passing through the first passage 25a of the water-cooled heat exchanger 25 may absorb heat from the coolant passing through the second passage 25b of the water-cooled heat exchanger 25, and accordingly the refrigerant may be evaporated in the water-cooled heat exchanger 25.

The exterior heat exchanger 13 may be disposed on the downstream side of the interior condenser 12, and the exterior heat exchanger 13 may have a refrigerant passage through which the refrigerant passes. The exterior heat exchanger 13 may be disposed adjacent to the front grille of the vehicle, and the exterior heat exchanger 13 may directly contact the ambient air so that the exterior heat exchanger 13 may be configured to transfer heat between the refrigerant and the ambient air. In particular, the exterior heat exchanger 13 may exchange heat with the ambient air forcibly blown by the cooling fan so that a heat transfer rate between the refrigerant and the ambient air may be further increased.

When the refrigerant is not expanded on the upstream side of the exterior heat exchanger 13, the non-expanded refrigerant may release heat to the ambient air and be condensed in the exterior heat exchanger 13. That is, when the refrigerant is not expanded on the upstream side of the exterior heat exchanger 13, the exterior heat exchanger 13 may serve as a condenser that condenses the refrigerant received from the interior condenser 12.

When the refrigerant is expanded on the upstream side of the exterior heat exchanger 13, the expanded refrigerant may absorb heat from the ambient air and be evaporated in the exterior heat exchanger 13. That is, when the refrigerant is expanded on the upstream side of the exterior heat exchanger 13, the exterior heat exchanger 13 may serve as an evaporator that evaporates the refrigerant received from the interior condenser 12.

The cooling-side expansion valve 14 may be disposed on the downstream side of the exterior heat exchanger 13, and the cooling-side expansion valve 14 may be located between the exterior heat exchanger 13 and the evaporator 15 in the refrigerant circulation path 30. The cooling-side expansion valve 14 may be disposed on the upstream side of the evaporator 15 and may adjust the flow of the refrigerant and/or the flow rate of the refrigerant into the evaporator 15. During a cooling operation of the HVAC system, the cooling-side expansion valve 14 may be configured to expand the refrigerant received from the exterior heat exchanger 13. According to an exemplary embodiment, the cooling-side expansion valve 14 may be a thermal expansion valve (TXV) which senses the temperature and/or pressure of the refrigerant and adjusts the opening degree of the cooling-side expansion valve 14.

The evaporator 15 may be disposed on the downstream side of the cooling-side expansion valve 14 and may receive the refrigerant expanded by the cooling-side expansion valve 14. The evaporator 15 may be configured to cool the air using the refrigerant received from the cooling-side expansion valve 14. That is, the refrigerant expanded by the cooling-side expansion valve 14 may absorb heat from the air and be evaporated in the evaporator 15. During the cooling operation of the HVAC system, the evaporator 15 may be configured to cool the air using the refrigerant cooled by the exterior heat exchanger 13 and expanded by the cooling-side expansion valve 14, and the air cooled by the refrigerant may be directed into the cabin.

The HVAC system according to an exemplary embodiment of the present disclosure may include the refrigerant heat exchanger 26 located between the interior condenser 12 and the compressor 11. The refrigerant heat exchanger 26 may be configured to transfer heat between the non-expanded refrigerant and the expanded refrigerant of the refrigerant discharged from the interior condenser 12.

The refrigerant heat exchanger 26 may include a first passage 26a through which the non-expanded refrigerant passes and a second passage 26b through which the expanded refrigerant passes. The first passage 26a and the second passage 26b may be fluidly separated from each other.

An inlet of the first passage 26a may be located on the downstream side of the interior condenser 12 and the downstream side of the exterior heat exchanger 13, and an outlet of the first passage 26a may be located on the upstream side of the cooling-side expansion valve 14 and the evaporator 15.

An inlet of the second passage 26b may be located on the downstream side of the interior condenser 12 and the downstream side of the water-cooled heat exchanger 25, and an outlet of the second passage 26b may be located on the upstream side of the compressor 11 and the accumulator 16.

The refrigerant heat exchanger 26 may be configured to transfer heat between the non-expanded refrigerant passing through the first passage 26a and the expanded refrigerant passing through the second passage 26b. The temperature of the non-expanded refrigerant may be higher than the temperature of the expanded refrigerant. Accordingly, the expanded refrigerant passing through the second passage 26b may absorb heat from the non-expanded refrigerant passing through the first passage 26a so that the expanded refrigerant may be evaporated (heated) and the non-expanded refrigerant may be condensed (cooled).

The HVAC case 70 may have an inlet and an outlet, and the HVAC case 70 may be configured to allow the air to be directed into the cabin of the vehicle. The evaporator 15 and the interior condenser 12 may be located inside the HVAC case 70. An air mixing door 71 may be disposed between the evaporator 15 and the interior condenser 12, and an electric heater 72 such as a positive temperature coefficient (PTC) heater may be disposed on the downstream side of the interior condenser 12 in an air flow direction.

The HVAC system according to an exemplary embodiment of the present disclosure may include a control valve unit 20 controlling the flow of the refrigerant (the direction of the refrigerant, the flow rate of the refrigerant, etc.) and the expansion and/or non-expansion of the refrigerant between the interior condenser 12, the water-cooled heat exchanger 25, the exterior heat exchanger 13, and the refrigerant heat exchanger 26.

The control valve unit 20 may include a first control valve 21 controlling the flow of the refrigerant in a manner that allows the refrigerant discharged from the interior condenser 12 to be directed to the exterior heat exchanger 13 or to bypass the exterior heat exchanger 13.

The first control valve 21 may include an inlet port 21a fluidly connected to the interior condenser 12, a first outlet port 21b fluidly connected to the first passage 26a of the refrigerant heat exchanger 26 and an outlet of the exterior heat exchanger 13, and a second outlet port 21c fluidly connected to an inlet of the exterior heat exchanger 13. The refrigerant discharged from the interior condenser 12 may be directed to the inlet port 21a of the first control valve 21 through a second line 32. The refrigerant discharged from the first outlet port 21b of the first control valve 21 may bypass the exterior heat exchanger 13 and be directed to the first passage 26a of the refrigerant heat exchanger 26, and the refrigerant discharged from the second outlet port 21c of the first control valve 21 may be directed to the exterior heat exchanger 13.

The first control valve 21 may be configured to allow the inlet port 21a to selectively communicate with the first outlet port 21b or the second outlet port 21c by a first actuator 21f. For example, the first control valve 21 may allow the inlet port 21a to communicate with the first outlet port 21b or the second outlet port 21c by moving a valve member such as a ball member or a needle member in a valve housing. The valve member is actuated by the first actuator 21f.

When the first control valve 21 performs a first switching operation to allow the inlet port 21a to communicate with the first outlet port 21b, the refrigerant discharged from the interior condenser 12 may be directed to the first passage 26a of the refrigerant heat exchanger 26 through the inlet port 21a and the first outlet port 21b, thereby bypassing the exterior heat exchanger 13. When the first control valve 21 performs the first switching operation, the opening degree of the first control valve 21 may be adjusted to 100% (that is, the first control valve 21 may be fully opened) by the valve member, and the refrigerant discharged from the first outlet port 21b of the first control valve 21 may not be expanded.

When the first control valve 21 performs a second switching operation to allow the inlet port 21a to communicate with the second outlet port 21c, the refrigerant discharged from the interior condenser 12 may be directed to the exterior heat exchanger 13 through the inlet port 21a and the second outlet port 21c. When the first control valve 21 performs the second switching operation, the opening degree of the first control valve 21 may be adjusted by the valve member so that the refrigerant may be expanded or may not be expanded. According to an exemplary embodiment, when the first control valve 21 performs the second switching operation, the opening degree of the first control valve 21 may be adjusted to be lower than 100% and exceed 0% by the valve member so that the refrigerant discharged from the second outlet port 21c of the first control valve 21 may be expanded. According to another exemplary embodiment, when the first control valve 21 performs the second switching operation, the opening degree of the first control valve 21 may be adjusted to 100% (that is, the first control valve 21 may be fully opened) by the valve member so that the refrigerant discharged from the second outlet port 21c of the first control valve 21 may not be expanded.

The control valve unit 20 may include a second control valve 22 controlling the flow of the refrigerant in a manner that allows the refrigerant discharged from the interior condenser 12 or the refrigerant discharged from the first passage 26a of the refrigerant heat exchanger 26 to be directed to the first passage 25a of the water-cooled heat exchanger 25.

The second control valve 22 may include a first inlet port 22a fluidly connected to the interior condenser 12, a second inlet port 22b fluidly connected to the outlet of the first passage 26a of the refrigerant heat exchanger 26, and an outlet port 22c fluidly connected to an inlet of the first passage 25a of the water-cooled heat exchanger 25. The refrigerant discharged from the interior condenser 12 may be directed to the first inlet port 22a of the second control valve 22 through the second line 32, the refrigerant discharged from the first passage 26a of the refrigerant heat exchanger 26 may be directed to the second inlet port 22b of the second control valve 22, and the refrigerant discharged from the outlet port 22c of the second control valve 22 may be directed to the first passage 25a of the water-cooled heat exchanger 25.

The second control valve 22 may be configured to allow the first inlet port 22a or the second inlet port 22b to selectively communicate with the outlet port 22c by a second actuator 22f. For example, the second control valve 22 may allow the first inlet port 22a or the second inlet port 22b to communicate with the outlet port 22c by moving a valve member such as a ball member or a needle member in a valve housing. The valve member is actuated by the second actuator 22f.

When the second control valve 22 performs a first switching operation to allow the first inlet port 22a to communicate with the outlet port 22c, the refrigerant discharged from the interior condenser 12 may be directed to the first passage 25a of the water-cooled heat exchanger 25 through the first inlet port 22a and the outlet port 22c. When the second control valve 22 performs the first switching operation, the opening degree of the second control valve 22 may be adjusted to be lower than 100% and to exceed 0% by the valve member so that the refrigerant discharged from the outlet port 22c of the second control valve 22 may be expanded.

When the second control valve 22 performs a second switching operation to allow the second inlet port 22b to communicate with the outlet port 22c, the refrigerant discharged from the first passage 26a of the refrigerant heat exchanger 26 may be directed to the first passage 25a of the water-cooled heat exchanger 25 through the second inlet port 22b and the outlet port 22c. When the second control valve 22 performs the second switching operation, the opening degree of the second control valve 22 may be adjusted to be lower than 100% and to exceed 0% by the valve member so that the refrigerant discharged from the outlet port 22c of the second control valve 22 may be expanded.

The control valve unit 20 may include a third control valve 23 controlling the flow of the refrigerant in a manner that allows the refrigerant discharged from the interior condenser 12 or the refrigerant discharged from the exterior heat exchanger 13 to be directed to the second passage 26b of the refrigerant heat exchanger 26.

The third control valve 23 may include a first inlet port 23a fluidly connected to the interior condenser 12, a second inlet port 23b fluidly connected to the first passage 26a of the refrigerant heat exchanger 26 and the outlet of the exterior heat exchanger 13, and an outlet port 23c fluidly connected to the inlet of the second passage 26b of the refrigerant heat exchanger 26. The refrigerant discharged from the interior condenser 12 may be directed to the first inlet port 23a of the third control valve 23 through the second line 32, the refrigerant discharged from the exterior heat exchanger 13 may be directed to the second inlet port 23b of the third control valve 23, and the refrigerant discharged from the outlet port 23c of the third control valve 23 may be directed to the second passage 26b of the refrigerant heat exchanger 26.

The third control valve 23 may be configured to allow the first inlet port 23a or the second inlet port 23b to selectively communicate with the outlet port 23c by a third actuator 23f. For example, the third control valve 23 may allow the first inlet port 23a or the second inlet port 23b to communicate with the outlet port 23c by moving a valve member such as a ball member or a needle member in a valve housing. The valve member is actuated by the third actuator 23f.

When the third control valve 23 performs a first switching operation to allow the first inlet port 23a to communicate with the outlet port 23c, the refrigerant discharged from the interior condenser 12 may be directed to the second passage 26b of the refrigerant heat exchanger 26 through the first inlet port 23a and the outlet port 23c. According to an exemplary embodiment, when the third control valve 23 performs the first switching operation, the opening degree of the third control valve 23 may be adjusted to be lower than 100% and to exceed 0% by the valve member so that the refrigerant discharged from the outlet port 23c of the third control valve 23 may be expanded. According to another exemplary embodiment, a diameter of the outlet port 23c may be less than a diameter of the first inlet port 23a and a diameter of the second inlet port 23b, and accordingly the flow rate of the refrigerant discharged from the outlet port 23c may be relatively low when the third control valve 23 performs the first switching operation.

When the third control valve 23 performs a second switching operation to allow the second inlet port 23b to communicate with the outlet port 23c, the refrigerant discharged from the exterior heat exchanger 13 may be directed to the second passage 26b of the refrigerant heat exchanger 26 through the second inlet port 23b and the outlet port 23c. When the third control valve 23 performs the second switching operation, the opening degree of the third control valve 23 may be adjusted to 100% (that is, the third control valve 23 may be fully opened) by the valve member so that the refrigerant discharged from the outlet port 23c of the third control valve 23 may not be expanded.

When icing occurs on the exterior heat exchanger 13 due to low ambient temperature, the refrigerant may not absorb heat from the ambient air through the exterior heat exchanger 13. In addition, when a heat generating amount of the PE component 82 is not high, the refrigerant may not absorb heat from the coolant system 80 through the water-cooled heat exchanger 25. In the case in which the refrigerant does not absorb heat through the exterior heat exchanger 13 and/or the water-cooled heat exchanger 25, as the third control valve 23 performs the first switching operation, the refrigerant discharged from the interior condenser 12 may be joined to the refrigerant discharged from the first passage 25a of the water-cooled heat exchanger 25 through the third control valve 23. The temperature of the refrigerant discharged from the outlet port 23c of the third control valve 23 may be higher than the temperature of the refrigerant discharged from the first passage 25a of the water-cooled heat exchanger 25. The refrigerant discharged from the interior condenser 12 and the refrigerant discharged from the first passage 25a of the water-cooled heat exchanger 25 may be joined at a connection point 63 so that the temperature of the refrigerant may be relatively increased. Then, the refrigerant may be directed to the second passage 26b of the refrigerant heat exchanger 26 so that refrigerant evaporation performance of the refrigerant heat exchanger 26 may be improved.

The first control valve 21, the second control valve 22, and the third control valve 23 may form a single module, and accordingly the control valve unit 20 and the HVAC system may be more easily assembled.

Referring to FIG. 1, the refrigerant circulation path 30 may include a first line 31 extending from an outlet of the compressor 11 to the interior condenser 12, the second line 32 extending from the interior condenser 12 to the control valve unit 20, a third line 33 extending from the control valve unit 20 to the inlet of the exterior heat exchanger 13, a fourth line 34 extending from the outlet of the exterior heat exchanger 13 to an inlet of the evaporator 15, a fifth line 35 extending from an outlet of the evaporator 15 to a downstream point of the first passage 25a of the water-cooled heat exchanger 25, and a sixth line 36 extending from the fifth line 35 to an inlet of the compressor 11.

The first passage 26a of the refrigerant heat exchanger 26 may be fluidly connected to the fourth line 34, and the second passage 26b of the refrigerant heat exchanger 26 may be fluidly connected to the sixth line 36. The connection point 63 of the fifth line 35 and the sixth line 36 may be located on the downstream side of the first passage 25a of the water-cooled heat exchanger 25 and the upstream side of the first passage 26a of the refrigerant heat exchanger 26.

The refrigerant discharged from the interior condenser 12 may be directed to at least one of the exterior heat exchanger 13, the refrigerant heat exchanger 26, and the water-cooled heat exchanger 25 through a branch point 40. The branch point 40 may be provided at an outlet of the second line 32, and the branch point 40 may be located between the first control valve 21, the second control valve 22, and the third control valve 23.

A first branch line 41 may extend from the branch point 40 to the inlet port 21a of the first control valve 21, and the first branch line 41 may be configured to guide at least a portion of the refrigerant discharged from the interior condenser 12 to the inlet port 21a of the first control valve 21. At least a portion of the refrigerant discharged from the interior condenser 12 may be directed from the branch point 40 to the inlet port 21a of the first control valve 21 through the first branch line 41.

A second branch line 42 may extend from the branch point 40 to the first inlet port 22a of the second control valve 22, and the second branch line 42 may be configured to guide at least a portion of the refrigerant discharged from the interior condenser 12 to the first inlet port 22a of the second control valve 22. At least a portion of the refrigerant discharged from the interior condenser 12 may be directed from the branch point 40 to the first inlet port 22a of the second control valve 22 through the second branch line 42.

A third branch line 43 may extend from the branch point 40 to the first inlet port 23a of the third control valve 23, and the third branch line 43 may be configured to guide at least a portion of the refrigerant discharged from the interior condenser 12 to the first inlet port 23a of the third control valve 23. At least a portion of the refrigerant discharged from the interior condenser 12 may be directed from the branch point 40 to the first inlet port 23a of the third control valve 23 through the third branch line 43.

The exterior heat exchanger 13 and the first passage 25a of the water-cooled heat exchanger 25 may be connected in parallel to the refrigerant circulation path 30 through the first branch line 41, the second branch line 42, and the third branch line 43.

The first outlet port 21b of the first control valve 21 may be fluidly connected to the fourth line 34 through a first connection line 51. The first connection line 51 may be configured to allow the refrigerant discharged from the first outlet port 21b of the first control valve 21 to bypass the exterior heat exchanger 13 and be guided to the first passage 26a of the refrigerant heat exchanger 26 through the fourth line 34. An inlet of the first connection line 51 may be connected to the first outlet port 21b of the first control valve 21. An outlet of the first connection line 51 may be connected to the fourth line 34 at a connection point 61 between the first passage 26a of the refrigerant heat exchanger 26 and the exterior heat exchanger 13.

The outlet port 22c of the second control valve 22 may be fluidly connected to the connection point 63 of the fifth line 35 and the sixth line 36 through a second connection line 52. The second connection line 52 may be configured to guide the refrigerant discharged from the outlet port 22c of the second control valve 22 to the first passage 25a of the water-cooled heat exchanger 25. An inlet of the second connection line 52 may be connected to the outlet port 22c of the second control valve 22. An outlet of the second connection line 52 may be connected to the connection point 63 of the fifth line 35 and the sixth line 36. The water-cooled heat exchanger 25 may be disposed in the second connection line 52, and the first passage 25a of the water-cooled heat exchanger 25 may be connected to the second connection line 52. The refrigerant discharged from the outlet port 22c of the second control valve 22 may pass through the first passage 25a of the water-cooled heat exchanger 25, and the refrigerant discharged from the first passage 25a of the water-cooled heat exchanger 25 may be directed to the second passage 26b of the refrigerant heat exchanger 26 through the sixth line 36. Accordingly, the water-cooled heat exchanger 25 may be fluidly connected to the refrigerant circulation path 30 through the second connection line 52, and the water-cooled heat exchanger 25 and the exterior heat exchanger 13 may be connected in parallel to the refrigerant circulation path 30.

The second inlet port 22b of the second control valve 22 may be fluidly connected to the fourth line 34 through a fifth connection line 55. The fifth connection line 55 may be configured to guide a portion of the refrigerant discharged from the first passage 26a of the refrigerant heat exchanger 26 to the second inlet port 22b of the second control valve 22. An inlet of the fifth connection line 55 may be connected to the fourth line 34 at a connection point 64 located on the downstream side of the first passage 26a of the refrigerant heat exchanger 26. An outlet of the fifth connection line 55 may be connected to the second inlet port 22b of the second control valve 22.

The second inlet port 23b of the third control valve 23 may be fluidly connected to the fourth line 34 through a third connection line 53. The third connection line 53 may be configured to guide the refrigerant discharged from the outlet of the exterior heat exchanger 13 to the second inlet port 23b of the third control valve 23. An inlet of the third connection line 53 may be connected to the fourth line 34 at a connection point 62 located on the upstream side of the first passage 26a of the refrigerant heat exchanger 26. An outlet of the third connection line 53 may be connected to the second inlet port 23b of the third control valve 23.

The outlet port 23c of the third control valve 23 may be fluidly connected to the sixth line 36 through a fourth connection line 54. The fourth connection line 54 may be configured to guide the refrigerant discharged from the outlet port 23c of the third control valve 23 to the second passage 26b of the refrigerant heat exchanger 26. An inlet of the fourth connection line 54 may be connected to the outlet port 23c of the third control valve 23. An outlet of the fourth connection line 54 may be connected to the connection point 63 of the fifth line 35 and the sixth line 36. The refrigerant discharged from the outlet port 23c of the third control valve 23 and the refrigerant discharged from the second connection line 52 may be joined at the connection point 63 and then may be directed to the sixth line 36.

A controller 100 may be configured to control the compressor 11, the first actuator 21f of the first control valve 21, the second actuator 22f of the second control valve 22, the third actuator 23f of the third control valve 23, the pump 84 of the coolant system 80, the cooling-side expansion valve 14, the air mixing door 71, and the electric heater 72, respectively. Therefore, the overall operation of the HVAC system may be controlled by the controller 100. According to an exemplary embodiment, the controller 100 may be a full automatic temperature control (FATC) system. The controller 100 may include a processor and a memory. The processor may be programmed to receive instructions stored in the memory and may transmit instructions to the HVAC system. The memory may be a data storage such as a hard disk drive, a solid state drive, a server, a volatile storage medium, and a non-volatile storage medium.

Figure 2:
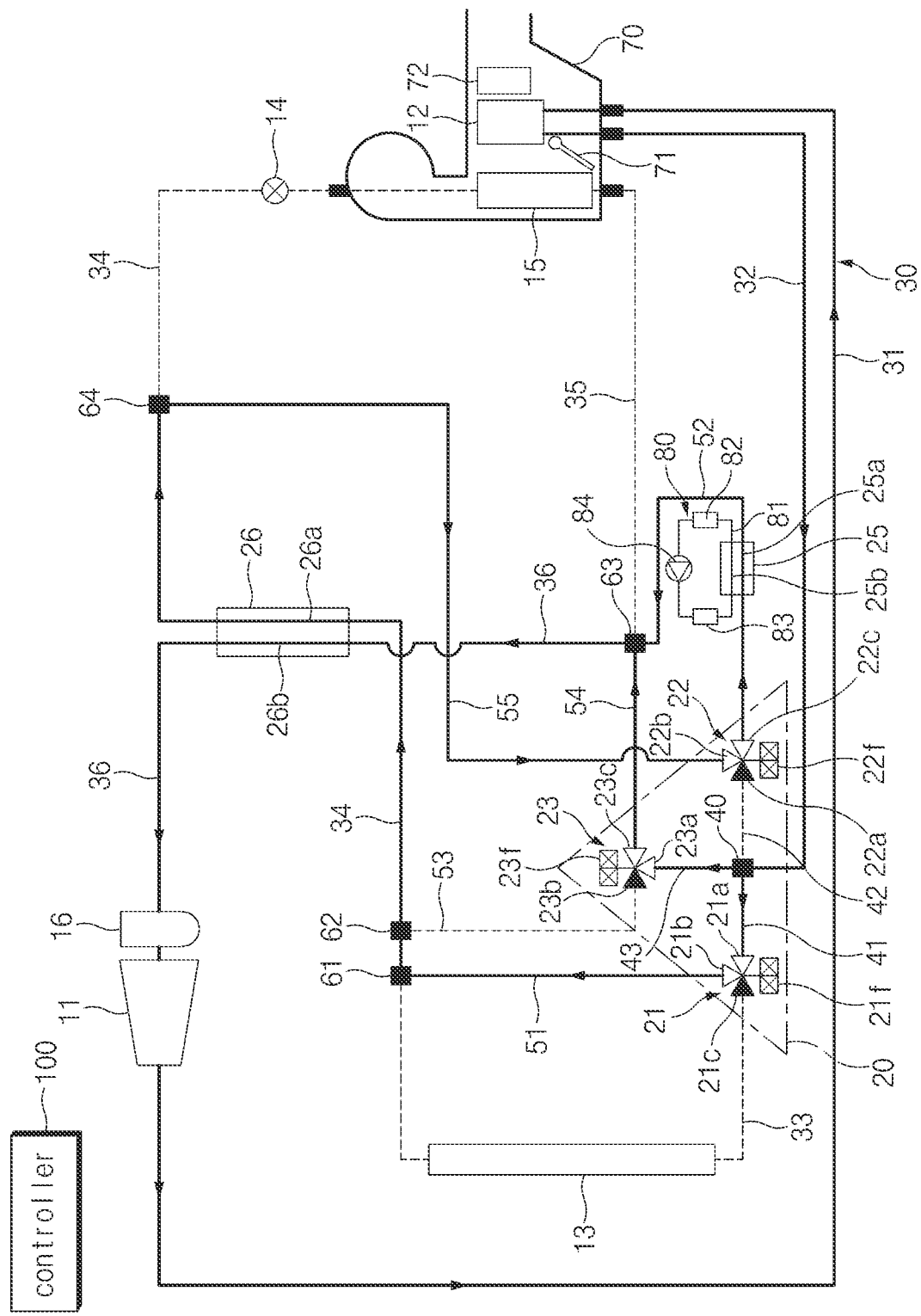
FIG. 2 illustrates the flow of a refrigerant when a vehicle HVAC system according to an exemplary embodiment of the present disclosure operates in a heating mode and icing occurs on an exterior heat exchanger.

FIG. 2 illustrates the flow of the refrigerant when the HVAC system according to an exemplary embodiment of the present disclosure operates in a heating mode and icing occurs on the exterior heat exchanger 13 as the ambient temperature is lower than a threshold temperature.

Referring to FIG. 2, the cooling-side expansion valve 14 may be closed, and the refrigerant compressed by the compressor 11 may flow into the interior condenser 12. The refrigerant passing through the interior condenser 12 may be cooled by the air passing through the HVAC case 70 so that the refrigerant passing through the interior condenser 12 may be condensed by the air. The first control valve 21 may perform the first switching operation to allow the inlet port 21a to communicate with the first outlet port 21b so that a portion of the refrigerant discharged from the interior condenser 12 may be directed to the first passage 26a of the refrigerant heat exchanger 26 through the first outlet port 21b of the first control valve 21 while bypassing the exterior heat exchanger 13.

Referring to FIG. 2, the second control valve 22 may perform the second switching operation to allow the second inlet port 22b to communicate with the outlet port 22c so that the refrigerant discharged from the first passage 26a of the refrigerant heat exchanger 26 may be directed to the first passage 25a of the water-cooled heat exchanger 25 through the second inlet port 22b and the outlet port 22c of the second control valve 22. As the second control valve 22 performs the second switching operation, the refrigerant discharged from the outlet port 22c of the second control valve 22 may be expanded, and the refrigerant expanded by the second control valve 22 may be directed to the first passage 25a of the water-cooled heat exchanger 25. The refrigerant passing through the first passage 25a of the water-cooled heat exchanger 25 may absorb heat from the coolant passing through the second passage 25b, and accordingly the refrigerant may be evaporated in the water-cooled heat exchanger 25.

Referring to FIG. 2, the third control valve 23 may perform the first switching operation to allow the first inlet port 23a to communicate with the outlet port 23c so that a remaining portion of the refrigerant discharged from the interior condenser 12 may be directed to the second passage 26b of the refrigerant heat exchanger 26 through the first inlet port 23a and the outlet port 23c of the third control valve 23. The remaining portion of the refrigerant discharged from the interior condenser 12 may be directed to the connection point 63 located on the downstream side of the first passage 25a of the water-cooled heat exchanger 25 through the first inlet port 23a and the outlet port 23c of the third control valve 23. As the third control valve 23 performs the first switching operation, the remaining portion of the refrigerant discharged from the interior condenser 12 may be joined to the refrigerant discharged from the first passage 25a of the water-cooled heat exchanger 25 through the third control valve 23. The temperature of the refrigerant discharged from the outlet port 23c of the third control valve 23 may be higher than the temperature of the refrigerant discharged from the first passage 25a of the water-cooled heat exchanger 25. The refrigerant discharged from the interior condenser 12 and the refrigerant discharged from the first passage 25a of the water-cooled heat exchanger 25 may be joined at the connection point 63 so that the temperature of the refrigerant may be relatively increased. Then, the refrigerant may be directed to the second passage 26b of the refrigerant heat exchanger 26 so that the refrigerant evaporation performance of the refrigerant heat exchanger 26 may be improved.

Referring to FIG. 2, the refrigerant discharged from the first outlet port 21b of the first control valve 21 may not be expanded, and the refrigerant discharged from the outlet port 22c of the second control valve 22 may be expanded. The temperature of the refrigerant discharged from the first outlet port 21b of the first control valve 21 may be higher than the temperature of the refrigerant discharged from the outlet port 22c of the second control valve 22. The non-expanded refrigerant may pass through the first passage 26a of the refrigerant heat exchanger 26, the expanded refrigerant may pass through the second passage 26b of the refrigerant heat exchanger 26 so that the expanded refrigerant may be evaporated by the non-expanded refrigerant, and the non-expanded refrigerant may be condensed by the expanded refrigerant.

Referring to FIG. 2, when the HVAC system operates in the heating mode in a condition in which the ambient temperature is relatively low, icing may occur on the exterior heat exchanger 13, and accordingly the refrigerant may need to bypass the exterior heat exchanger 13. In addition, since the heat generating amount of the PE component 82 is not high, the temperature of the coolant circulating in the coolant circulation path 81 of the coolant system 80 may not be relatively high. Accordingly, the refrigerant passing through the first passage 25a of the water-cooled heat exchanger 25 may fail to sufficiently absorb heat from the second passage 25b of the water-cooled heat exchanger 25, so the refrigerant may not be sufficiently evaporated in the water-cooled heat exchanger 25. That is, in the condition in which the ambient temperature is relatively low, the refrigerant may not be able to sufficiently absorb heat from the exterior heat exchanger 13 and the water-cooled heat exchanger 25. To deal with this, the HVAC system according to an exemplary embodiment of the present disclosure may allow the refrigerant heat exchanger 26 to additionally provide heat for evaporation of the refrigerant under the relatively low ambient temperature condition. Accordingly, the refrigerant may be evaporated in two steps through the water-cooled heat exchanger 25 and the refrigerant heat exchanger 26 so that superheating of the refrigerant may be ensured. In addition, after a portion of the refrigerant discharged from the interior condenser 12 and the refrigerant discharged from the first passage 25a of the water-cooled heat exchanger 25 are joined through the third control valve 23, the refrigerant may be directed to the second passage 26b of the refrigerant heat exchanger 26 so that it may additionally absorb heat. Thus, the refrigerant evaporation performance may be further improved.

Figure 3:
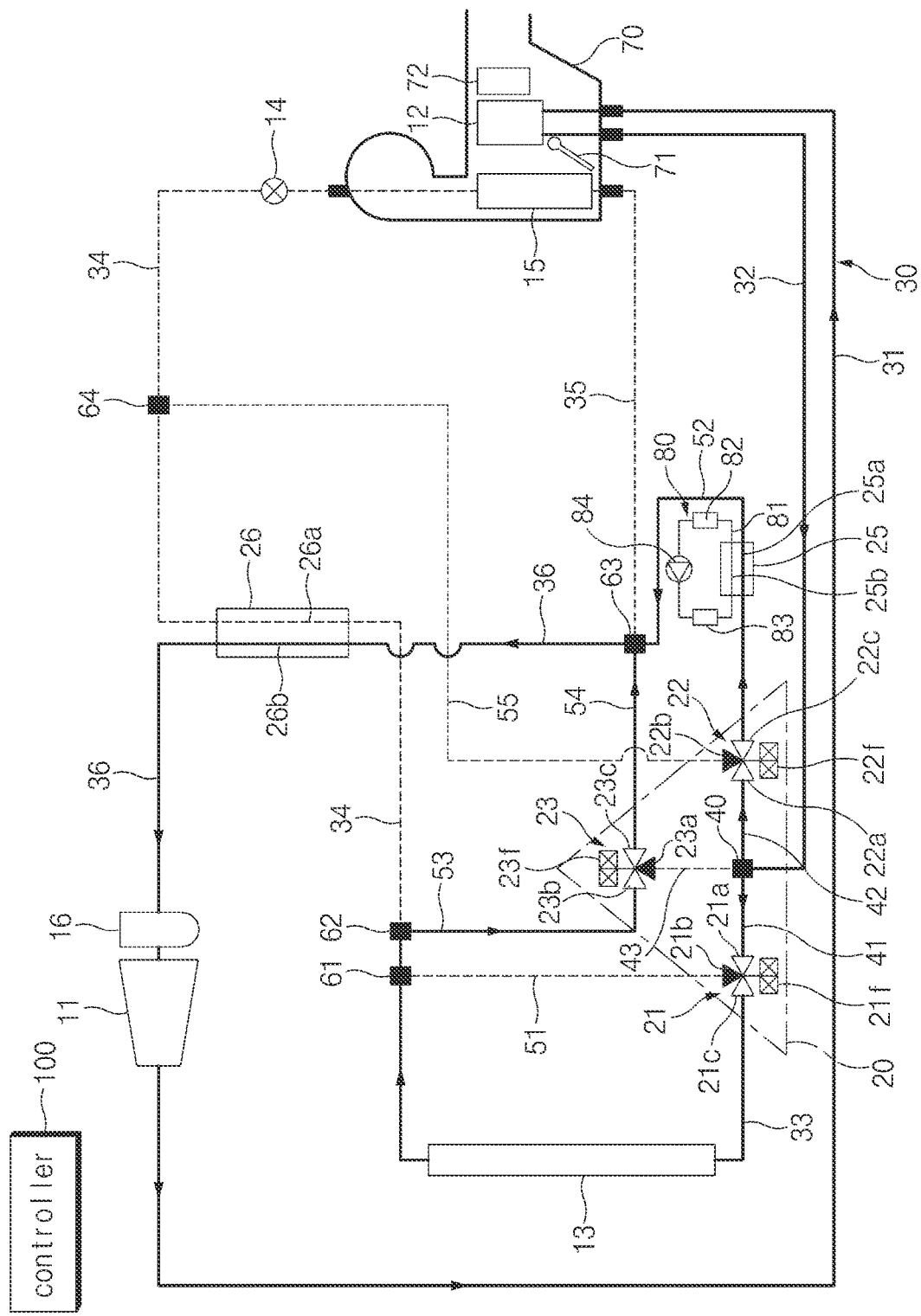
FIG. 3 illustrates the flow of a refrigerant when a vehicle HVAC system according to an exemplary embodiment of the present disclosure operates in a heating mode and icing does not occur on an exterior heat exchanger.

FIG. 3 illustrates the flow of the refrigerant when the HVAC system according to an exemplary embodiment of the present disclosure operates in a heating mode and icing does not occur on the exterior heat exchanger 13 as the ambient temperature is higher than a threshold temperature.

Referring to FIG. 3, the cooling-side expansion valve 14 may be closed, and the refrigerant compressed by the compressor 11 may flow into the interior condenser 12. The refrigerant passing through the interior condenser 12 may be cooled by the air passing through the HVAC case 70 so that the refrigerant passing through the interior condenser 12 may be condensed by the air. The first control valve 21 may perform the second switching operation to allow the inlet port 21a to communicate with the second outlet port 21c so that a portion of the refrigerant discharged from the interior condenser 12 may be directed to the exterior heat exchanger 13 through the second outlet port 21c of the first control valve 21. Here, when the first control valve 21 performs the second switching operation, the opening degree of the first control valve 21 may be adjusted to be lower than 100% and to exceed 0% by the valve member so that the refrigerant discharged from the second outlet port 21c of the first control valve 21 may be expanded. The refrigerant expanded by the first control valve 21 may be directed to the exterior heat exchanger 13. The refrigerant passing through the exterior heat exchanger 13 may absorb heat from the ambient air so that the refrigerant may be evaporated.

Referring to FIG. 3, the second control valve 22 may perform the first switching operation to allow the first inlet port 22a to communicate with the outlet port 22c so that a remaining portion of the refrigerant discharged from the interior condenser 12 may pass through the first passage 25a of the water-cooled heat exchanger 25. As the second control valve 22 performs the first switching operation, the refrigerant discharged from the outlet port 22c of the second control valve 22 may be expanded. The refrigerant expanded by the second control valve 22 may be directed to the first passage 25a of the water-cooled heat exchanger 25. The refrigerant passing through the first passage 25a of the water-cooled heat exchanger 25 may absorb heat from the coolant passing through the second passage 25b, and accordingly the refrigerant may be evaporated in the water-cooled heat exchanger 25.

Referring to FIG. 3, the third control valve 23 may perform the second switching operation to allow the second inlet port 23b to communicate with the outlet port 23c so that the refrigerant discharged from the exterior heat exchanger 13 may be directed to the second passage 26b of the refrigerant heat exchanger 26 through the second inlet port 23b and the outlet port 23c of the third control valve 23, the fourth connection line 54, and the sixth line 36. When the third control valve 23 performs the second switching operation, the opening degree of the third control valve 23 may be adjusted to 100% (that is, the third control valve 23 may be fully opened) by the valve member, and the refrigerant discharged from the outlet port 23c of the third control valve 23 may not be expanded.

Referring to FIG. 3, after the refrigerant discharged from the outlet port 23c of the third control valve 23 and the refrigerant discharged from the first passage 25a of the water-cooled heat exchanger 25 are joined at the connection point 63, the refrigerant may be directed to the second passage 26b of the refrigerant heat exchanger 26, and the refrigerant discharged from the second passage 26b of the refrigerant heat exchanger 26 may be directed to the compressor 11.

Referring to FIG. 3, in a condition in which the ambient temperature is relatively high, the refrigerant may be evaporated through the exterior heat exchanger 13 and the water-cooled heat exchanger 25, and thus the refrigerant evaporation performance may be sufficiently achieved.

Figure 4:
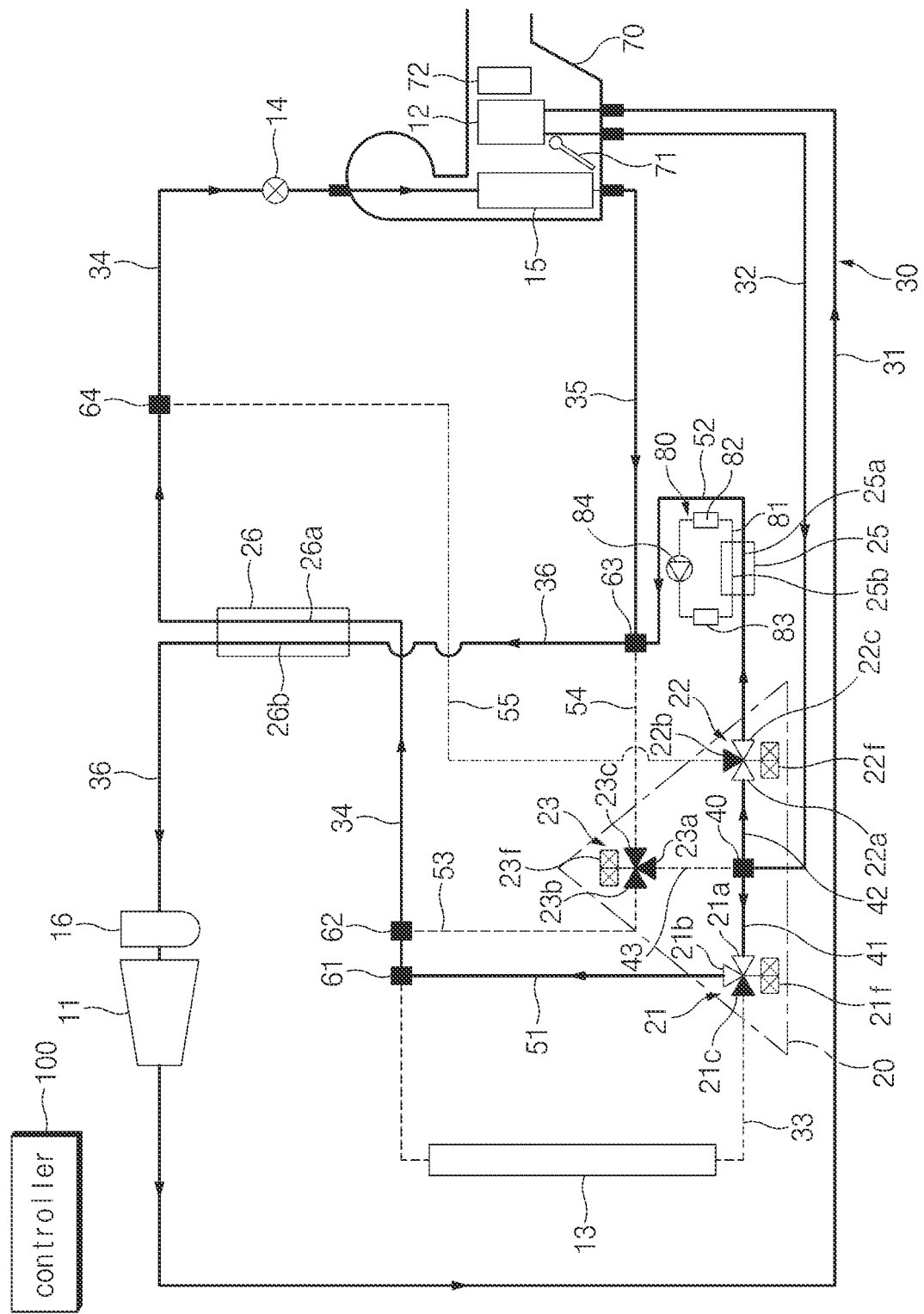
FIG. 4 illustrates the flow of a refrigerant when a vehicle HVAC system according to an exemplary embodiment of the present disclosure operates in a heating and dehumidification mode.

FIG. 4 illustrates the flow of the refrigerant when the HVAC system according to an exemplary embodiment of the present disclosure operates in a heating and dehumidification mode.

Referring to FIG. 4, the refrigerant compressed by the compressor 11 may flow into the interior condenser 12, and the refrigerant passing through the interior condenser 12 may be cooled by the air passing through the HVAC case 70 so that the refrigerant passing through the interior condenser 12 may be condensed by the air. The first control valve 21 may perform the first switching operation to allow the inlet port 21a to communicate with the first outlet port 21b so that a portion of the refrigerant discharged from the interior condenser 12 may be directed to the first passage 26a of the refrigerant heat exchanger 26 through the first outlet port 21b of the first control valve 21 while bypassing the exterior heat exchanger 13.

Referring to FIG. 4, the second control valve 22 may perform the first switching operation to allow the first inlet port 22a to communicate with the outlet port 22c so that a remaining portion of the refrigerant discharged from the interior condenser 12 may pass through the first passage 25a of the water-cooled heat exchanger 25. As the second control valve 22 performs the first switching operation, the refrigerant discharged from the outlet port 22c of the second control valve 22 may be expanded. The refrigerant expanded by the second control valve 22 may be directed to the first passage 25a of the water-cooled heat exchanger 25. The refrigerant passing through the first passage 25a of the water-cooled heat exchanger 25 may absorb heat from the coolant passing through the second passage 25b, and accordingly the refrigerant may be evaporated in the water-cooled heat exchanger 25.

Referring to FIG. 4, the cooling-side expansion valve 14 may be opened, and the first inlet port 23a, the second inlet port 23b, and the outlet port 23c of the third control valve 23 may all be closed. The refrigerant discharged from the first passage 26a of the refrigerant heat exchanger 26 may be directed to the evaporator 15 through the cooling-side expansion valve 14. The refrigerant may be expanded by the cooling-side expansion valve 14, and the expanded refrigerant may be evaporated by the evaporator 15. After the refrigerant discharged from the evaporator 15 and the refrigerant discharged from the first passage 25a of the water-cooled heat exchanger 25 are joined at the connection point 63, the refrigerant may be directed to the second passage 26b of the refrigerant heat exchanger 26, and the refrigerant discharged from the second passage 26b of the refrigerant heat exchanger 26 may be directed to the compressor 11. The air passing through the HVAC case 70 may be cooled by the evaporator 15 so that the air flowing into the cabin may be dehumidified.

Referring to FIG. 4, the refrigerant discharged from the first outlet port 21b of the first control valve 21 may not be expanded, and the refrigerant discharged from the outlet port 22c of the second control valve 22 may be expanded. The temperature of the refrigerant discharged from the first outlet port 21b of the first control valve 21 may be higher than the temperature of the refrigerant discharged from the outlet port 22c of the second control valve 22. The non-expanded refrigerant may pass through the first passage 26a of the refrigerant heat exchanger 26, the expanded refrigerant may pass through the second passage 26b of the refrigerant heat exchanger 26 so that the expanded refrigerant may be evaporated by the non-expanded refrigerant, and the non-expanded refrigerant may be condensed by the expanded refrigerant. Accordingly, the refrigerant may be condensed in two steps through the interior condenser 12 and the refrigerant heat exchanger 26 so that subcooling of the refrigerant may be ensured, and the refrigerant may be evaporated in two steps through the water-cooled heat exchanger 25 and the refrigerant heat exchanger 26 so that superheating of the refrigerant may be ensured.

Figure 5:
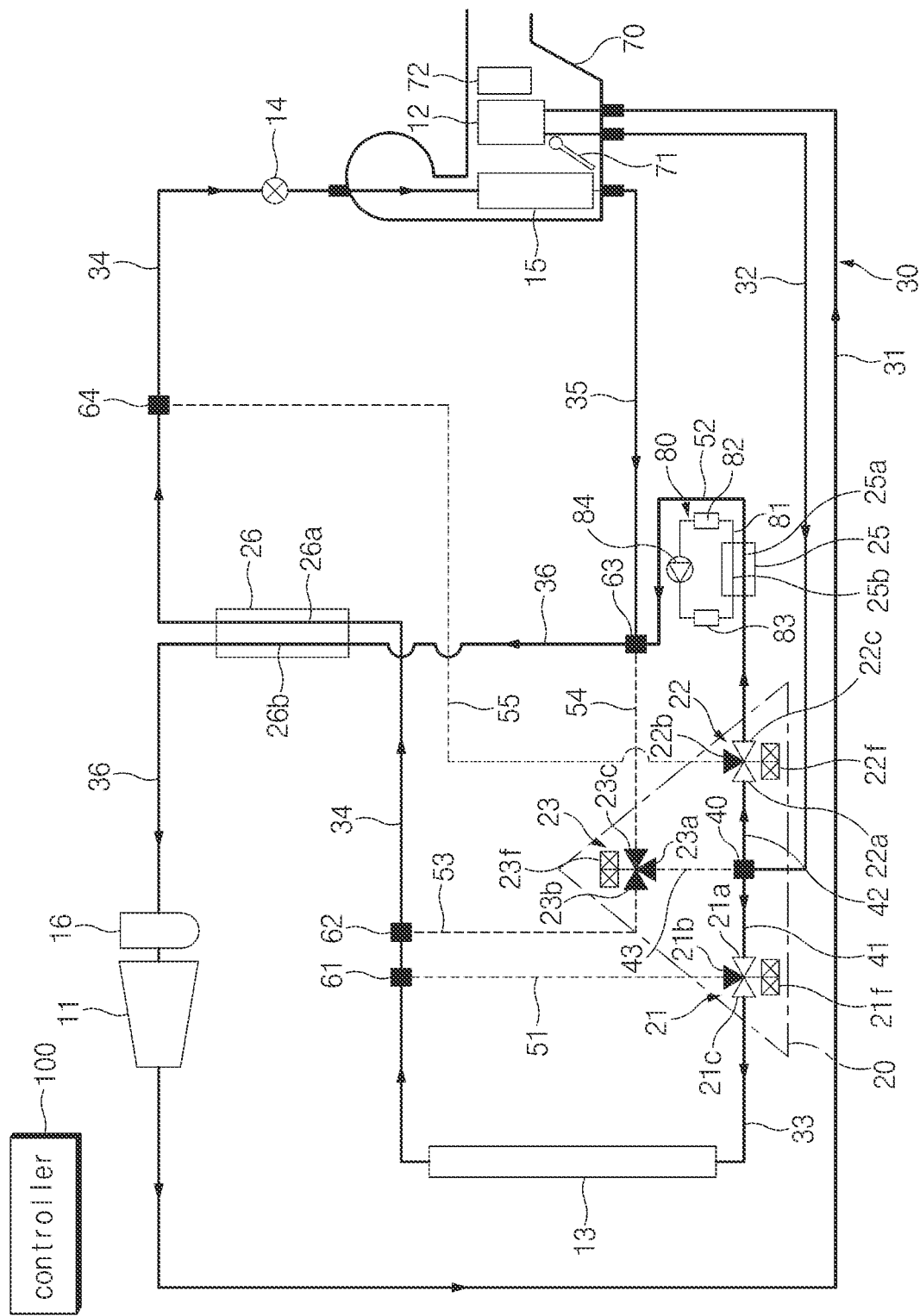
FIG. 5 illustrates the flow of a refrigerant when a vehicle HVAC system according to an exemplary embodiment of the present disclosure operates in a heating and dehumidification boost mode.

FIG. 5 illustrates the flow of the refrigerant when the HVAC system according to an exemplary embodiment of the present disclosure operates in a heating and dehumidification boost mode.

Referring to FIG. 5, the refrigerant compressed by the compressor 11 may flow into the interior condenser 12, and the refrigerant passing through the interior condenser 12 may be cooled by the air passing through the HVAC case 70 so that the refrigerant passing through the interior condenser 12 may be condensed by the air. The first control valve 21 may perform the second switching operation to allow the inlet port 21a to communicate with the second outlet port 21c so that a portion of the refrigerant discharged from the interior condenser 12 may be directed to the exterior heat exchanger 13 through the second outlet port 21c of the first control valve 21. Here, when the first control valve 21 performs the second switching operation, the opening degree of the first control valve 21 may be adjusted to 100% (that is, the first control valve 21 may be fully opened) by the valve member so that the refrigerant discharged from the second outlet port 21c of the first control valve 21 may not be expanded. The refrigerant may release heat to the ambient air through the exterior heat exchanger 13 so that the refrigerant may be cooled and condensed by the ambient air.

Referring to FIG. 5, the second control valve 22 may perform the first switching operation to allow the first inlet port 22a to communicate with the outlet port 22c so that a remaining portion of the refrigerant discharged from the interior condenser 12 may pass through the first passage 25a of the water-cooled heat exchanger 25. As the second control valve 22 performs the first switching operation, the refrigerant discharged from the outlet port 22c of the second control valve 22 may be expanded. The refrigerant expanded by the second control valve 22 may be directed to the first passage 25a of the water-cooled heat exchanger 25. The refrigerant passing through the first passage 25a of the water-cooled heat exchanger 25 may absorb heat from the coolant passing through the second passage 25b, and accordingly the refrigerant may be evaporated in the water-cooled heat exchanger 25.

Referring to FIG. 5, the cooling-side expansion valve 14 may be opened, and the first inlet port 23a, the second inlet port 23b, and the outlet port 23c of the third control valve 23 may all be closed. The refrigerant discharged from the first passage 26a of the refrigerant heat exchanger 26 may be directed to the evaporator 15 through the cooling-side expansion valve 14. The refrigerant may be expanded by the cooling-side expansion valve 14, and the expanded refrigerant may be evaporated by the evaporator 15. After the refrigerant discharged from the evaporator 15 and the refrigerant discharged from the first passage 25a of the water-cooled heat exchanger 25 are joined at the connection point 63, the refrigerant may be directed to the second passage 26b of the refrigerant heat exchanger 26, and the refrigerant discharged from the second passage 26b of the refrigerant heat exchanger 26 may be directed to the compressor 11. The air passing through the HVAC case 70 may be cooled by the evaporator 15 so that the air flowing into the cabin may be dehumidified.

Referring to FIG. 5, the refrigerant discharged from the second outlet port 21c of the first control valve 21 may not be expanded, and the refrigerant discharged from the outlet port 22c of the second control valve 22 may be expanded. The non-expanded refrigerant may pass through the first passage 26a of the refrigerant heat exchanger 26, the expanded refrigerant may pass through the second passage 26b of the refrigerant heat exchanger 26 so that the expanded refrigerant may be evaporated by the non-expanded refrigerant in the refrigerant heat exchanger 26, and the non-expanded refrigerant may be condensed by the expanded refrigerant in the refrigerant heat exchanger 26. Accordingly, the refrigerant may be condensed in three steps through the interior condenser 12, the exterior heat exchanger 13, and the refrigerant heat exchanger 26 so that subcooling of the refrigerant may be ensured, and the refrigerant may be evaporated in two steps through the water-cooled heat exchanger 25 and the refrigerant heat exchanger 26 so that superheating of the refrigerant may be ensured. By ensuring the subcooling of the refrigerant and the superheating of the refrigerant, a suction pressure of the compressor 11 may be relatively reduced so that power consumption of the compressor 11 may be minimized.

Figure 6:
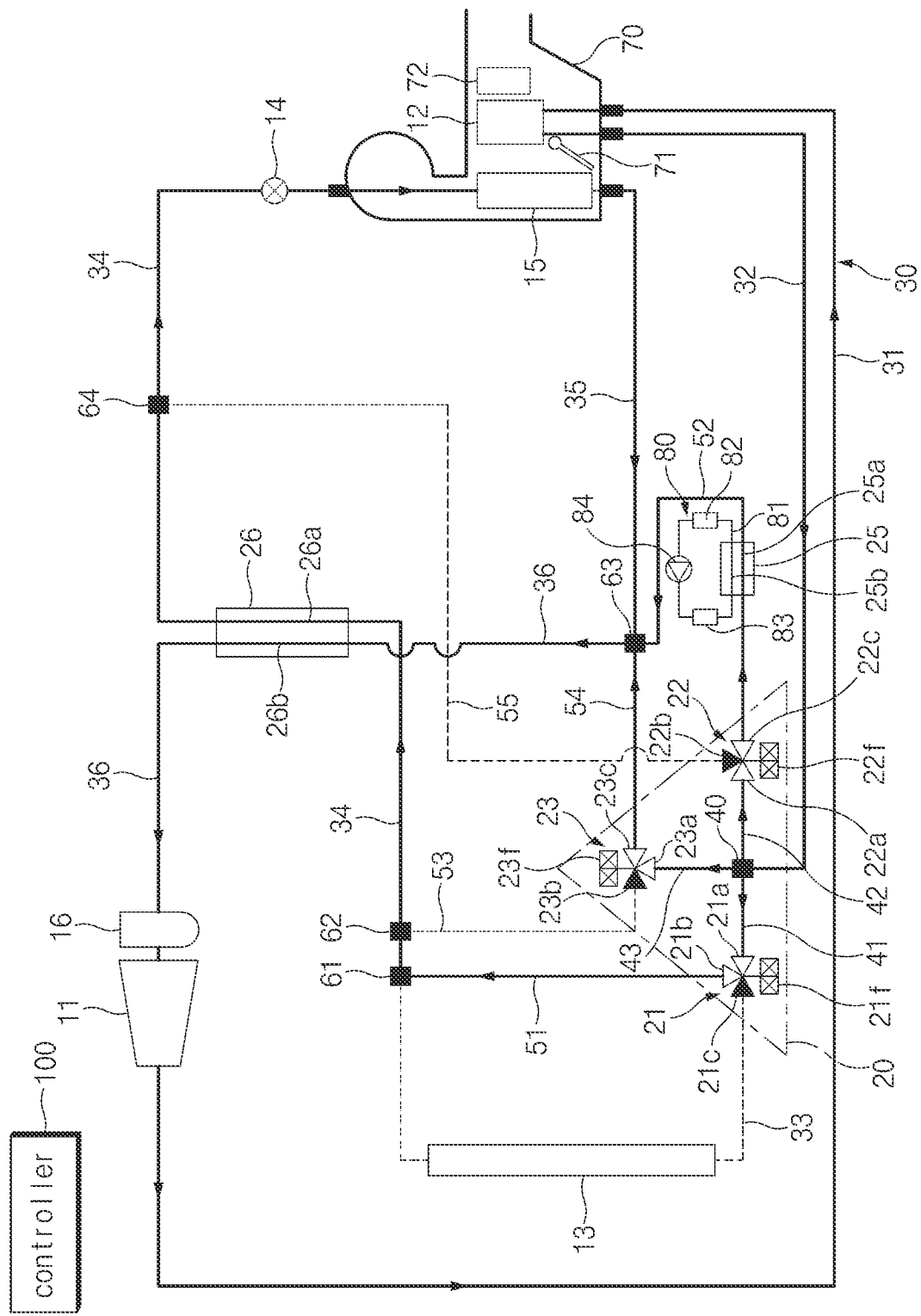
FIG. 6 illustrates the flow of a refrigerant when a vehicle HVAC system according to an exemplary embodiment of the present disclosure operates in a heating boost and dehumidification mode.

FIG. 6 illustrates the flow of the refrigerant when the HVAC system according to an exemplary embodiment of the present disclosure operates in a heating boost and dehumidification mode.

Referring to FIG. 6, the refrigerant compressed by the compressor 11 may flow into the interior condenser 12, and the refrigerant passing through the interior condenser 12 may be cooled by the air passing through the HVAC case 70 so that the refrigerant passing through the interior condenser 12 may be condensed by the air. The first control valve 21 may perform the first switching operation to allow the inlet port 21a to communicate with the first outlet port 21b so that a portion of the refrigerant discharged from the interior condenser 12 may be directed to the first passage 26a of the refrigerant heat exchanger 26 through the first outlet port 21b of the first control valve 21 while bypassing the exterior heat exchanger 13.

Referring to FIG. 6, the second control valve 22 may perform the first switching operation to allow the first inlet port 22a to communicate with the outlet port 22c so that a remaining portion of the refrigerant discharged from the interior condenser 12 may pass through the first passage 25a of the water-cooled heat exchanger 25. As the second control valve 22 performs the first switching operation, the refrigerant discharged from the outlet port 22c of the second control valve 22 may be expanded. The refrigerant expanded by the second control valve 22 may be directed to the first passage 25a of the water-cooled heat exchanger 25. The refrigerant passing through the first passage 25a of the water-cooled heat exchanger 25 may absorb heat from the coolant passing through the second passage 25b, and accordingly the refrigerant may be evaporated in the water-cooled heat exchanger 25.

Referring to FIG. 6, the cooling-side expansion valve 14 may be opened, and the refrigerant discharged from the first passage 26a of the refrigerant heat exchanger 26 may be directed to the evaporator 15 through the cooling-side expansion valve 14. The refrigerant may be expanded by the cooling-side expansion valve 14, and the expanded refrigerant may be evaporated by the evaporator 15. After the refrigerant discharged from the evaporator 15 and the refrigerant discharged from the first passage 25a of the water-cooled heat exchanger 25 are joined at the connection point 63, the refrigerant may be directed to the second passage 26b of the refrigerant heat exchanger 26, and the refrigerant discharged from the second passage 26b of the refrigerant heat exchanger 26 may be directed to the compressor 11. The air passing through the HVAC case 70 may be cooled by the evaporator 15 so that the air flowing into the cabin may be dehumidified.

Referring to FIG. 6, the third control valve 23 may perform the first switching operation to allow the first inlet port 23a to communicate with the outlet port 23c so that a remaining portion of the refrigerant discharged from the interior condenser 12 may be directed to the second passage 26b of the refrigerant heat exchanger 26 through the first inlet port 23a and the outlet port 23c of the third control valve 23. The remaining portion of the refrigerant discharged from the interior condenser 12 may be directed to the connection point 63 located on the downstream side of the first passage 25a of the water-cooled heat exchanger 25 through the first inlet port 23a and the outlet port 23c of the third control valve 23. As the third control valve 23 performs the first switching operation, the remaining portion of the refrigerant discharged from the interior condenser 12 may be joined to the refrigerant discharged from the first passage 25a of the water-cooled heat exchanger 25 through the third control valve 23. The temperature of the refrigerant discharged from the outlet port 23c of the third control valve 23 may be higher than the temperature of the refrigerant discharged from the first passage 25a of the water-cooled heat exchanger 25. The refrigerant discharged from the interior condenser 12 and the refrigerant discharged from the first passage 25a of the water-cooled heat exchanger 25 may be joined at the connection point 63 so that the temperature of the refrigerant may be relatively increased. Then, the refrigerant may be directed to the second passage 26b of the refrigerant heat exchanger 26 so that the refrigerant evaporation performance of the refrigerant heat exchanger 26 may be improved.

Referring to FIG. 6, the refrigerant discharged from the first outlet port 21b of the first control valve 21 may not be expanded, and the refrigerant discharged from the outlet port 22c of the second control valve 22 may be expanded. The non-expanded refrigerant may pass through the first passage 26a of the refrigerant heat exchanger 26, and the expanded refrigerant may pass through the second passage 26b of the refrigerant heat exchanger 26 so that the expanded refrigerant may be evaporated by the non-expanded refrigerant in the refrigerant heat exchanger 26, and the non-expanded refrigerant may be condensed by the expanded refrigerant in the refrigerant heat exchanger 26. The refrigerant may be condensed in two steps through the interior condenser 12 and the refrigerant heat exchanger 26 so that subcooling of the refrigerant may be ensured, and the refrigerant may be evaporated through the evaporator 15, the water-cooled heat exchanger 25, and the refrigerant heat exchanger 26 so that superheating of the refrigerant may be ensured. By ensuring the subcooling of the refrigerant and the superheating of the refrigerant, the heating of the cabin may be quickly performed.

As set forth above, the HVAC system according to exemplary embodiments of the present disclosure may allow the refrigerant heat exchanger to additionally provide heat for evaporation of the refrigerant under a relatively low ambient temperature condition. Accordingly, the refrigerant may be evaporated in two steps through the water-cooled heat exchanger and the refrigerant heat exchanger so that superheating of the refrigerant may be ensured.

According to exemplary embodiments of the present disclosure, when the HVAC system operates in the heating mode and icing occurs on the exterior heat exchanger, a portion of the refrigerant discharged from the interior condenser and the refrigerant discharged from the water-cooled heat exchanger may be joined through the third control valve, and then the refrigerant may be directed to the refrigerant heat exchanger so that the refrigerant may additionally absorb heat.

According to exemplary embodiments of the present disclosure, in a condition in which the ambient temperature is relatively high, the refrigerant may be evaporated through the exterior heat exchanger and the water-cooled heat exchanger, and thus the refrigerant evaporation performance may be improved.

According to exemplary embodiments of the present disclosure, when the HVAC system operates in the heating and dehumidification mode, the refrigerant may be condensed in three steps through the interior condenser, the exterior heat exchanger, and the refrigerant heat exchanger so that the subcooling of the refrigerant may be ensured, and the refrigerant may be evaporated in two steps through the water-cooled heat exchanger and the refrigerant heat exchanger so that the superheating of the refrigerant may be ensured. By ensuring the subcooling of the refrigerant and the superheating of the refrigerant, the suction pressure of the compressor may be relatively reduced so that the power consumption of the compressor may be minimized.

According to exemplary embodiments of the present disclosure, when the HVAC system operates in the heating boost and dehumidification mode, the refrigerant may be condensed in two steps through the interior condenser and the refrigerant heat exchanger so that the subcooling of the refrigerant may be ensured, and the refrigerant may be evaporated through the evaporator, the water-cooled heat exchanger, and the refrigerant heat exchanger so that the superheating of the refrigerant may be ensured. By ensuring the subcooling of the refrigerant and the superheating of the refrigerant, the heating of the cabin may be quickly performed.

Hereinabove, although embodiments of the present disclosure have been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle heating, ventilation, and air conditioning (HVAC) system, comprising:
    a compressor;
    an interior condenser disposed on a downstream side of the compressor;
    a refrigerant heat exchanger located between the interior condenser and the compressor, wherein the refrigerant heat exchanger is configured to transfer heat between an expanded refrigerant and a non-expanded refrigerant of a refrigerant discharged from the interior condenser;
    a water-cooled heat exchanger disposed on a downstream side of the interior condenser and configured to transfer heat between the refrigerant and a coolant circulating in a coolant system;
    an exterior heat exchanger disposed on the downstream side of the interior condenser and configured to transfer heat between the refrigerant and ambient air; and
    a control valve unit configured to control a flow of the refrigerant and expansion and/or non-expansion of the refrigerant between the interior condenser, the water-cooled heat exchanger, the exterior heat exchanger, and the refrigerant heat exchanger.

2. The vehicle HVAC system according to claim 1, wherein the refrigerant heat exchanger includes a first passage through which the non-expanded refrigerant passes and a second passage through which the expanded refrigerant passes.

3. The vehicle HVAC system according to claim 2, wherein the control valve unit includes a first control valve configured to allow the refrigerant discharged from the interior condenser to be directed to the exterior heat exchanger or to bypass the exterior heat exchanger.

4. The vehicle HVAC system according to claim 3, wherein the first control valve includes an inlet port fluidly connected to the interior condenser, a first outlet port fluidly connected to the first passage of the refrigerant heat exchanger and an outlet of the exterior heat exchanger, and a second outlet port fluidly connected to an inlet of the exterior heat exchanger.

5. The vehicle HVAC system according to claim 4, wherein the first control valve is configured to allow the inlet port to selectively communicate with the first outlet port or the second outlet port.

6. The vehicle HVAC system according to claim 2, wherein the control valve unit includes a second control valve configured to allow the refrigerant discharged from the interior condenser or the refrigerant discharged from the first passage of the refrigerant heat exchanger to be directed to the water-cooled heat exchanger.

7. The vehicle HVAC system according to claim 6, wherein the second control valve includes a first inlet port fluidly connected to the interior condenser, a second inlet port fluidly connected to the first passage of the refrigerant heat exchanger, and an outlet port fluidly connected to a first passage of the water-cooled heat exchanger.

8. The vehicle HVAC system according to claim 7, wherein the second control valve is configured to allow the first inlet port or the second inlet port to selectively communicate with the outlet port.

9. The vehicle HVAC system according to claim 7, wherein an opening degree of the second control valve is configured to be adjusted in a state in which the first inlet port or the second inlet port is in communication with the outlet port.

10. The vehicle HVAC system according to claim 2, wherein the control valve unit includes a third control valve configured to allow the refrigerant discharged from the interior condenser or the exterior heat exchanger to be directed to the second passage of the refrigerant heat exchanger.

11. The vehicle HVAC system according to claim 10, wherein the third control valve includes a first inlet port fluidly connected to the interior condenser, a second inlet port fluidly connected to the exterior heat exchanger, and an outlet port fluidly connected to an inlet of the second passage of the refrigerant heat exchanger.

12. The vehicle HVAC system according to claim 11, wherein the third control valve is configured to allow the first inlet port or the second inlet port to selectively communicate with the outlet port.

13. The vehicle HVAC system according to claim 2, further comprising:
a cooling-side expansion valve located on a downstream side of the first passage of the refrigerant heat exchanger; and
an evaporator located on a downstream side of the cooling-side expansion valve.

14. The vehicle HVAC system according to claim 2, wherein:
an inlet of the first passage of the refrigerant heat exchanger is located on the downstream side of the interior condenser and a downstream side of the exterior heat exchanger;
an inlet of the second passage of the refrigerant heat exchanger is located on the downstream side of the interior condenser and a downstream side of the water-cooled heat exchanger; and
an outlet of the second passage of the refrigerant heat exchanger is located on an upstream side of the compressor.

15. A vehicle heating, ventilation, and air conditioning (HVAC) system comprising:
a compressor;
an interior condenser disposed on a downstream side of the compressor;
a refrigerant heat exchanger located between the interior condenser and the compressor, wherein the refrigerant heat exchanger is configured to transfer heat between an expanded refrigerant and a non-expanded refrigerant of a refrigerant discharged from the interior condenser;
a water-cooled heat exchanger disposed on a downstream side of the interior condenser and configured to transfer heat between the refrigerant and a coolant circulating in a coolant system;
an exterior heat exchanger disposed on the downstream side of the interior condenser and configured to transfer heat between the refrigerant and ambient air, wherein the water-cooled heat exchanger and the exterior heat exchanger are connected in parallel to a refrigerant circulation path; and
a control valve unit configured to control a flow of the refrigerant and expansion and/or non-expansion of the refrigerant between the interior condenser, the water-cooled heat exchanger, the exterior heat exchanger, and the refrigerant heat exchanger.

16. The vehicle HVAC system according to claim 15, wherein the refrigerant heat exchanger includes a first passage through which the non-expanded refrigerant passes and a second passage through which the expanded refrigerant passes.

17. The vehicle HVAC system according to claim 16, wherein:
the control valve unit includes a first control valve configured to allow the refrigerant discharged from the interior condenser to be directed to the exterior heat exchanger or to bypass the exterior heat exchanger;
the first control valve includes an inlet port fluidly connected to the interior condenser, a first outlet port fluidly connected to the first passage of the refrigerant heat exchanger and an outlet of the exterior heat exchanger, and a second outlet port fluidly connected to an inlet of the exterior heat exchanger; and
the first control valve is configured to allow the inlet port to selectively communicate with the first outlet port or the second outlet port.

18. The vehicle HVAC system according to claim 16, wherein:
the control valve unit includes a second control valve configured to allow the refrigerant discharged from the interior condenser or the refrigerant discharged from the first passage of the refrigerant heat exchanger to be directed to the water-cooled heat exchanger;
the second control valve includes a first inlet port fluidly connected to the interior condenser, a second inlet port fluidly connected to the first passage of the refrigerant heat exchanger, and an outlet port fluidly connected to a first passage of the water-cooled heat exchanger;
the second control valve is configured to allow the first inlet port or the second inlet port to selectively communicate with the outlet port; and
an opening degree of the second control valve is configured to be adjusted in a state in which the first inlet port or the second inlet port is in communication with the outlet port.

19. The vehicle HVAC system according to claim 16, wherein:
- the control valve unit includes a third control valve configured to allow the refrigerant discharged from the interior condenser or the exterior heat exchanger to be directed to the second passage of the refrigerant heat exchanger;
- the third control valve includes a first inlet port fluidly connected to the interior condenser, a second inlet port fluidly connected to the exterior heat exchanger, and an outlet port fluidly connected to an inlet of the second passage of the refrigerant heat exchanger; and
- the third control valve is configured to allow the first inlet port or the second inlet port to selectively communicate with the outlet port.

20. The vehicle HVAC system according to claim 16, further comprising:
- a cooling-side expansion valve located on a downstream side of the first passage of the refrigerant heat exchanger; and
- an evaporator located on a downstream side of the cooling-side expansion valve.

\* \* \* \* \*